United States Patent

Romanski et al.

[11] 3,919,119
[45] Nov. 11, 1975

[54] ATTRITION-RESISTANT TITANIUM CATALYST CARRIER AND METHOD OF MAKING SAME

[75] Inventors: Andrzej Antoni Florian Romanski; Derek John Brookes, both of Sheffield; Anthony Smith, Rotherham; Harry Markham, Sheffield, all of England

[73] Assignee: British Steel Corporation (Chemicals) Limited, London, England

[22] Filed: June 3, 1974

[21] Appl. No.: 475,908

[30] Foreign Application Priority Data
June 4, 1973  United Kingdom............ 26483/73

[52] U.S. Cl. ............................................. 252/461
[51] Int. Cl.² ........................................ B01J 21/06
[58] Field of Search ................................. 252/461

[56] References Cited
UNITED STATES PATENTS

| | | | |
|---|---|---|---|
| 3,092,457 | 6/1963 | Sprague | 252/461 |
| 3,565,829 | 2/1971 | Friedrichsen et al. | 252/461 X |

Primary Examiner—W. J. Shine
Attorney, Agent, or Firm—Cushman, Darby & Cushman

[57] ABSTRACT

The invention relates to a method of producing, from powdered titanium dioxide, a hard attrition-resistant catalyst carrier. The titanium dioxide, may be for example AHR grade anatase mixed with a titanium chelate such as diethanolamine titanate and with a gelling agent. The gelling agent may be water or it may be for example, aqueous ammonia. The mixture is allowed to gell, it is then dried, and calcined at a temperature of the order of 800°C for 2 hours. The resultant catalyst carrier is particularly valuable as a base for an ortho-xylene oxidation catalyst.

8 Claims, No Drawings

ATTRITION-RESISTANT TITANIUM CATALYST CARRIER AND METHOD OF MAKING SAME

Titanium dioxide has been found to be a very good carrier for oxidation catalysts such as ortho-xylene. These catalysts are often used in fluid beds and one requirement of such a catalyst is that it should have an attrition-resistant carrier which also has good fluidizing properties.

Commercial grades of titania lack these characteristics. It is an object of the invention to provide a hard attrition-resistant catalyst carrier.

In accordance with the invention, a method of producing a hard attrition-resistant catalyst carrier comprises mixing a titanium chelate such as diethanolamine titanate (DEAT) with untreated titanium dioxide and a gelling agent, allowing the mixture to gel and then drying and calcining the resultant products.

The gelling agent may be water, aqueous ammonia or solutions of other suitable bases.

An example of a suitable titanium dioxide is British Titan Products AHR grade anatase.

The resultant carrier is particularly useful as a base for ortho-xylene oxidation catalyst.

The anatase must be used in powder form.

A preferred method of carrying out the process involves:

A. Powdering titania
B. Mixing the DEAT and water or ammonia solution
C. Adding the powdered titania to the solution slowly and mixing thoroughly. It is important that the total liquid volume is sufficient to wet the powdered titania completely.
D. Allowing the mixture to gel and then to dry.
E. After drying, this material is then calcined at a temperature of the order of 800°C for at least 2 hours.

Calcination time is dependant on the size of the batch and also, to a certain extent, on the type of equipment used.

Critical features of this process are the concentration of the DEAT, the calcining temperature, and the rate of drying of the mixture.

DEAT, or diethanolamine titanate, is prepared by the interaction of diethanolamine as a chelating agent and tetraisopropyl titanate. It is a chelated ester of titanium.

Other examples of chelated esters of titanium which can be used are the four Tilcom AT compounds (chelates based on iso-propyl titanate and mixed amino alcohols) triethanolamine titanate and titanium lactate, all of which can be made to gel in aqueous solutions.

Other forms of titania can be used in place of AHR anatase with varying degrees of ease. Montecatini type A-051 is particularly satisfactory.

In accordance with the invention a catalyst carrier is made by the following process:

DEAT and the gelling agent (normally water alone or ammonia solution) aree quickly mixed together with vigorous stirring. Powdered titania is added slowly to the solution and mixed thoroughly until complete homogeneity is assured.

The mixture is allowed to gel. It is then allowed to dry either ambient temperatures or preferably by heating in an oven at moderate temperatures (e.g. 100°C).

Careful control of the calcination stage is important because this affects the hardness and surface area of the final product. With increasing calcination temperature (above 500°C) the mechanical strength of the base (as measured by friability index) increases and its surface area decreases. There is a marked increase in mechanical strength on increasing calcination temperatures between 650°C and 800°C and also above 900°C, but between 800°C and 900°C there is only a very slight increase. The decrease in surface area is more rapid above 900°C than at lower temperatures. Also in the case of anatase if too high a temperature is used isomerization to rutile will take place which will reduce the selectivity of catalysts made from it for certain reactions. After calcination the mixture is allowed to cool to ambient temperature, and then crushed. Friability tests and surface area estimations are then carried out.

Friability is expressed as an index which represents a measure of the resistance of the material to mechanical disintegration.

In a preferred formulation, 1.5 litres of DEAT was mixed with 2.6 litres of water and 10 kg of powdered AHR anatase slowly added. After two hours the material had gelled. The product was then divided into slices and allowed to dry at 25°C for 78 hours and then calcined for 4 hours at 800°C. This resulted in a carrier having a friability index of 74.1. The calcined titania was crushed through a 44BSS mesh before being used for catalyst manufacture. This material is particularly useful as a carrier for a fluid bed catalyst which may be used for the oxidation of orthoxylene to phthalic anhydride.

TESTING

The resistance of anatase samples to mechanical disintegration is compared by the modified ball-mill test, which was originally developed for testing the microstrength of coke (H. E. Blyden, W. Noble, H. L. Riley, J. Iron & Steel Institute, 47P. 1937 75P 1939).

In this method, which differs from the original only in experimental details resulting from the different strengths of two materials, 1 gm of base of 14-16 B.S.S. size grading is placed in a ¾ inch dia. 8½ inch long steel tube together with three ¼ inch dia. steelballs and rotated for 370 revolutions at 25 R.P.M.

The friability index is defined as the percentage of base which after testing is retained on a 25 B.S. sieve. The greater the stength of the material the higher the friability index.

We claim:

1. A method of producing a hard attrition-resistant catalyst carrier comprising mixing a titanium chelate with titanium dioxide in powder form and a gelling agent, allowing the mixture to gel and then drying and calcining the gelled mixture at a temperature above 500°C.

2. A method according to claim 1 and in which the gelling agent is water.

3. A method according to claim 1 and in which the gelling agent is aqueous ammonia.

4. A method according to claim 1 and in which the titanium dioxide is anatase.

5. A method of preparing a hard attrition-resistant catalyst carrier comprising:
   a. Powdering titania;
   b. Mixing diethanolamine titanate and water or ammonia solution;
   c. Adding the powdered titania to the solution slowly and mixing thoroughly;
   d. Allowing the mixture to gel and then to dry;

c. After drying, calcining this material at a temperature of the order of 800°C for at least 2 hours.

6. A method according to claim 1 and in which the chelate is diethanolamine titanate.

7. A method according to claim 1 and in which the chelate is one of the group consisting of chelates based on isopropyl titanate and mixed amino alcohols, triethanolamine titanate and titanium lactate.

8. A catalyst carrier produced in accordance with the method claimed in claim 1.

* * * * *